Figure 1:
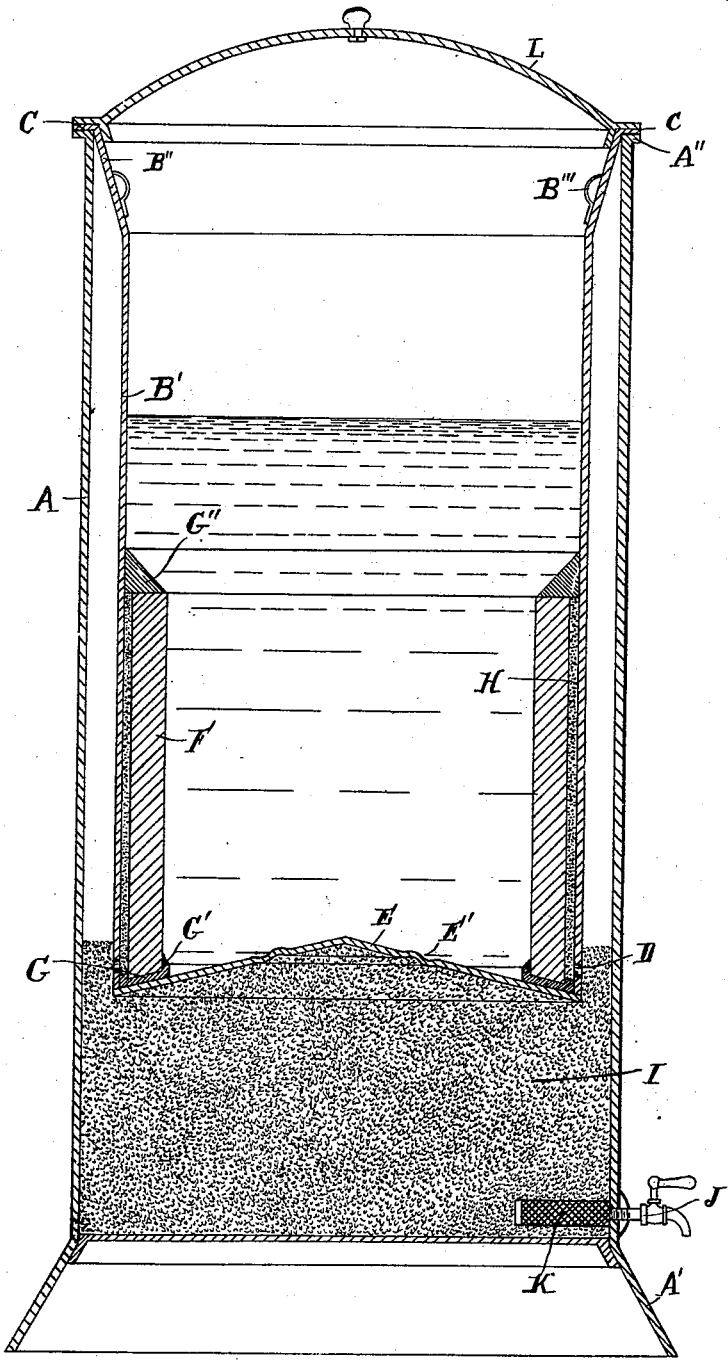

(No Model.)  4 Sheets—Sheet 1.

J. B. & J. F. ZIEGLER.
C. B. ZIEGLER, Administratrix & J. F. ZIEGLER, Administrator, of J. B. ZIEGLER, Deceased.
WATER FILTER.

No. 510,666.  Patented Dec. 12, 1893.

WITNESSES
Carroll J. Webster.
Floyd R. Webster.

INVENTORS
John B. Ziegler and
John F. Ziegler.
Caroline B. and John F. Ziegler.
Administrators of John B. Ziegler.

By William Webster
Atty

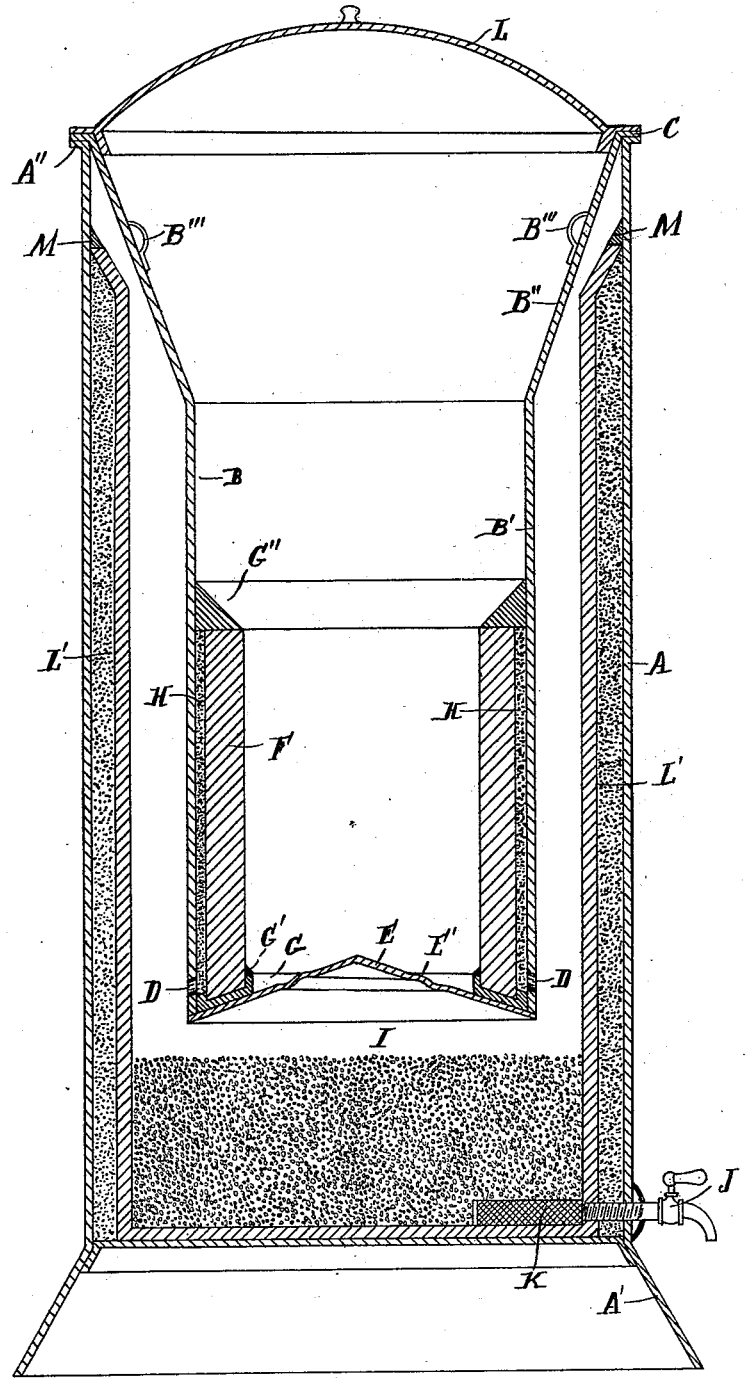

(No Model.) 4 Sheets—Sheet 3.

J. B. & J. F. ZIEGLER.
C. B. ZIEGLER, Administratrix & J. F. ZIEGLER, Administrator, of J. B. ZIEGLER, Deceased.
WATER FILTER.

No. 510,666. Patented Dec. 12, 1893.

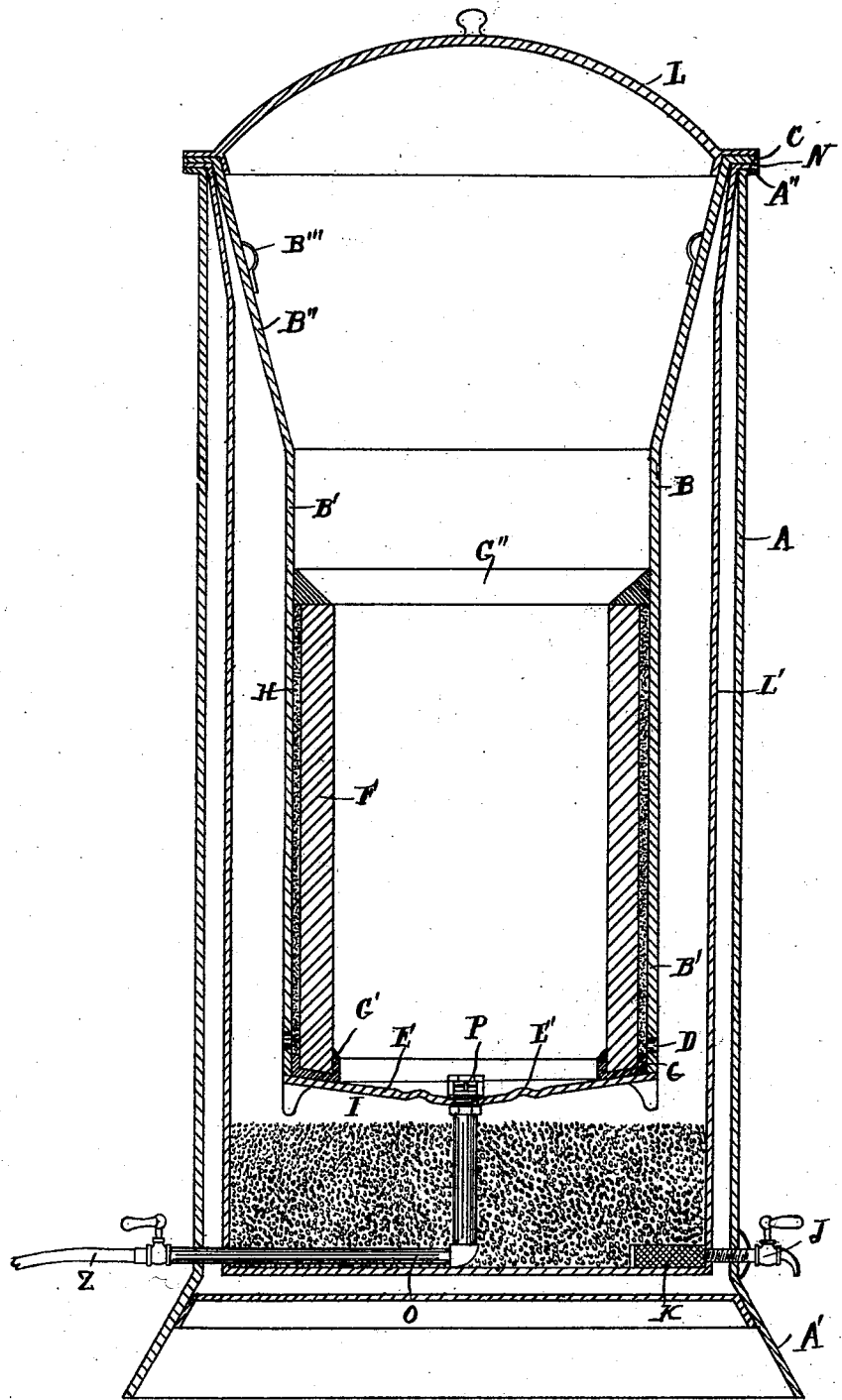

Fig 3.

WITNESSES
Carroll J. Webster
Lloyd R. Webster

INVENTORS
John B. Ziegler and
John F. Ziegler.
Caroline B. and John F. Ziegler
Administrators of John B. Ziegler
By William Webster Atty

THE NATIONAL LITHOGRAPHING COMPANY,
WASHINGTON, D. C.

(No Model.) 4 Sheets—Sheet 4.
J. B. & J. F. ZIEGLER.
C. B. ZIEGLER, Administratrix & J. F. ZIEGLER, Administrator, of J. B. ZIEGLER, Deceased.
WATER FILTER.
No. 510,666. Patented Dec. 12, 1893.
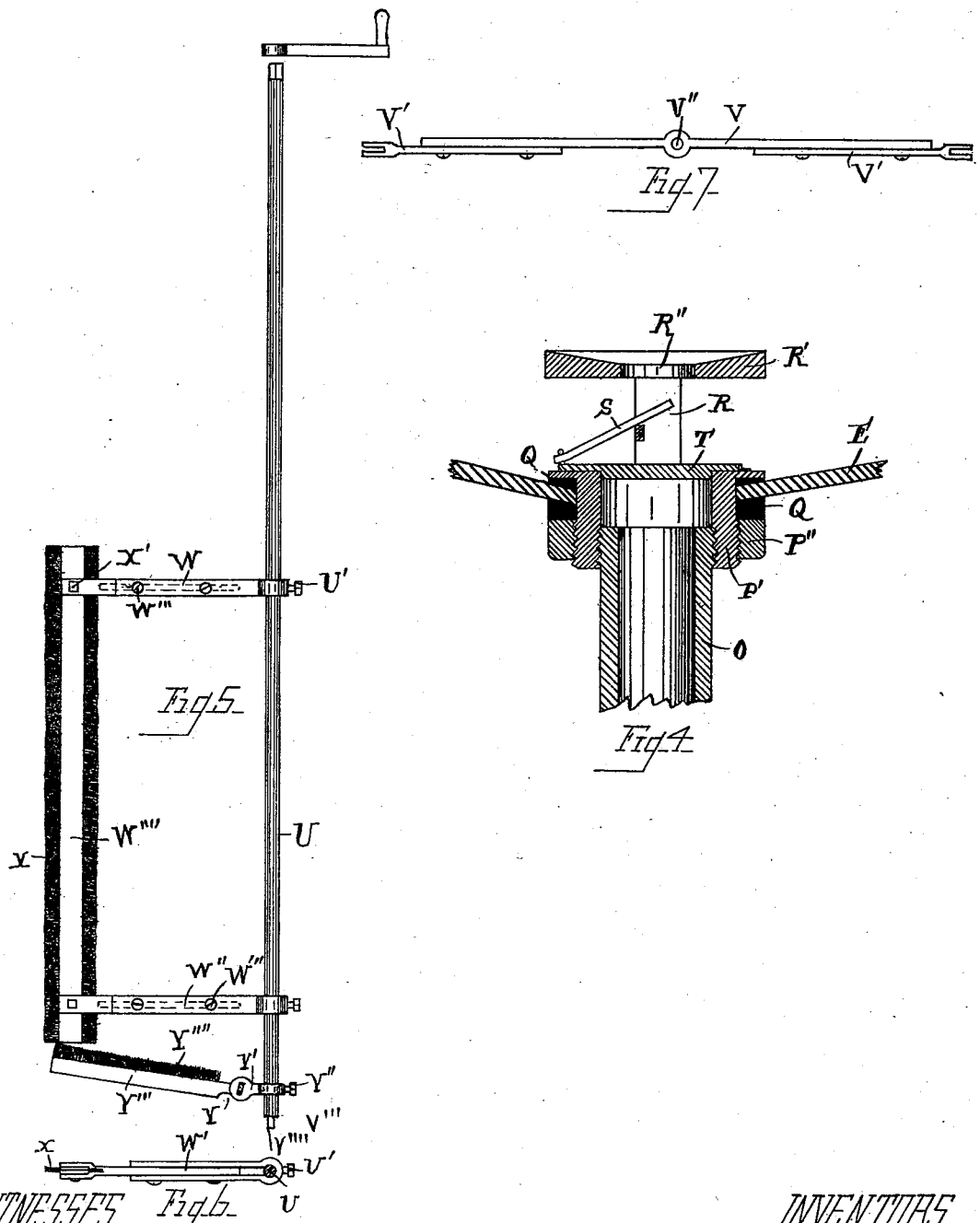

UNITED STATES PATENT OFFICE.

CAROLINE B. ZIEGLER AND JOHN F. ZIEGLER, OF TOLEDO, OHIO, ADMINISTRATORS OF JOHN B. ZIEGLER, DECEASED, AND JOHN F. ZIEGLER.

WATER-FILTER.

SPECIFICATION forming part of Letters Patent No. 510,666, dated December 12, 1893.

Application filed September 11, 1889. Serial No. 323,676. (No model.)

*To all whom it may concern:*

Be it known that JOHN B. ZIEGLER, deceased, and JOHN F. ZIEGLER, of Toledo, county of Lucas, and State of Ohio, did invent certain new and useful Improvements in Water-Filters prior to the decease of the said JOHN B. ZIEGLER, of which the following is a full, clear, and exact description, which will enable others skilled in the art to which it appertains to make and use the same, reference being had to the accompanying drawings, and to the letters of reference marked thereon, which form part of this specification.

The invention relates to water filters of that class in which the water is caused to pass through a filtering medium composed of plastic material having a porosity that will allow the water to percolate therethrough and separate the extraneous matter by reason of the minuteness of the interstices through which the water passes, thereby arresting the matter mechanically in suspension therein, as well as the abnoxious gases, and effete matter.

The object of the invention is to provide an inner receptacle for water having perforations near its lower extremity and carrying within its walls an outwardly discharging porous filter the whole to be incased by an outer shell that shall act as a receptacle for filtered water.

A further object is to form the outer receptacle or shell and the inner receptacle in a manner that shall allow of suspending the inner receptacle within the outer shell.

A further object is to form the suspended water receptacle of an interior diameter relatively to the exterior diameter of the porous filter that there shall be an annular chamber between the two sealed above and below against the entrance of water except in a filtered state.

A further object is to construct the receptacle for filtered water in a manner that will allow the inner receptacle and its contained porous filter to be removed therefrom when desired.

A further object is to construct the receptacle for unfiltered water with an outwardly inclined upper portion having a flange at right angles to the outer shell, whereby to economize in space in forming an enlarged area for the reception of ice when desired, and also to form a close joint between the two receptacles.

A further object is to provide a lining supplemental to the outer casing or shell, and intermediate the same and the receptacle for unfiltered water, whereby to more fully insulate the inner water receptacle from atmospheric influences.

A further object is to provide means for withdrawing the water and accumulation of sediment from the inner receptacle by means of a pipe connected therewith.

A further object is to provide a valve located within the inner receptacle, that shall prevent the passage of sediment to the pipe connected therewith until such times as the valve shall be raised thereby providing for flushing the pipe, and carrying away the sedimentary deposit.

A further object is to provide a cleaning device that shall be journaled within the inner receptacle and by means of radial arms connected therewith remove the sedimentary deposit from the annular surface of the porous filter or bottom of the receptacle.

A further object is to provide means for opening the valve at the base of the inner receptacle, when the removal of sediment is effected.

The invention consists in the parts and combination of parts hereinafter described and pointed out in the claims.

In the drawings: Figure 1 is a longitudinal vertical section of a filter showing the inner receptacle with the porous filter in position therein, and the outer case within which the inner receptacle is suspended. Fig. 2 is a like view showing a receptacle for filtered water formed of plastic material and supplemental to the outer casing. Fig. 3 is a like view with the receptacle for filtered water composed of metal, and also showing a pipe connected with a valve located within the interior of the inner receptacle. Fig. 4 is a longitudinal vertical sectional view of the valve and coupling, this view being drawn on an enlarged scale. Fig. 5 is a side elevation of an insertible cleaner for removing sedimentary deposit from the porous filter, and bottom E of the receptacle. Fig. 6 is a detail view of one of the adjustable arms of the cleaner. Fig. 7 is a detail view of an adjustable bar in which the shaft of the cleaner is journaled.

A designates an outer shell or casing, which may be of any form in cross section and may be composed of pottery, glass, wood, wood fiber, galvanized iron or any material having the strength to sustain the parts suspended therefrom. Shell A is preferably formed with a flaring base A' thereby not only producing an ornamental effect to the same, but forming a broad base upon which the upper portion is sustained. The upper portion or top of case A may be left straight or it may be turned at right angles as at A'', or angled in any manner to cause greater rigidity to the same.

B designates an inner receptacle for unfiltered water, being preferably formed with a cylindrical portion B', and a flaring portion B'' having a diameter at the upper end corresponding with the internal diameter of the shell or casing A, the upper end of the receptacle B being turned at right angles to the vertical sides of shell A, thereby forming an annular hanger C, by which the receptacle is suspended within the shell with the hanger C resting closely upon the upper end of shell A.

D designates a series of perforations formed in the receptacle B, near the bottom E thereof for a purpose hereinafter stated.

In forming the bottom of the receptacle B, the same may incline upwardly, as shown in Figs. 1 and 2, this arrangement being preferred for filters for domestic purposes, or in constructing filters of greater capacity the bottom may incline downwardly, and connect a pipe therewith as shown in Fig. 3; and to give greater rigidity to the bottom a bead or corrugation E' is formed in the same, about centrally of the diameter, this being a preferred arrangement, although in some forms of receptacles, the bottom may be flat, this being the usual construction in cheaper grades of filters.

F designates the porous filter preferably constructed in the form of a cylinder open at each end, the cylinder being of slightly less diameter than the receptacle B, and sustained therein preferably by resting at the base upon an annular flanged ring G resting upon the bottom of the receptacle, and further sealed against the possibility of water passing between the ring and cylinder by means of a packing G' of cement or analogous substance. The upper end of the filter cylinder is joined with the wall of the receptacle by means of an annular packing G'' of cement or analogous substance preferably inclined from the inner circumference of the filter cylinder to the point of joinder with the receptacle as shown to prevent lodgment of dirt or sediment thereon. By the arrangement described there is formed an annular chamber H between the filter cylinder and receptacle therefor, sealed at the top and bottom against the passage of water except in a filtered state, and into which may be placed any granular substance as filtering charcoal, or any porous substance to act as a support to the filter cylinder against the outward pressure of water, and also as supplemental to the filtering medium.

I designates a receptacle for the filtered water being directly beneath and surrounding the receptacle for unfiltered water and is preferably packed with filtering charcoal through which the water passes after having been filtered through the cylinder the charcoal having a tendency to absorb any gases should the same have passed through the filtering cylinder.

J designates a faucet through which the filtered water is withdrawn. The inner end of the faucet is secured within a foraminous tube K which prevents the ingress of the charcoal or other filtering material.

The casings are closed at the top by a removable cover L thereby allowing free access to the interior of the inner chamber to fill or clean the same, and when it is desired to gain access to the outer casing or receptacle for filtered water it is accomplished by grasping hooks, or handles B''' secured upon the interior of receptacle B and raising the receptacle from the casing.

Should it be desired to construct the filter to adapt the same for use as a cooler and filter with provision for insulating the filtered water from climatic variations in temperature, the receptacle for filtered water is constructed of a diameter to rest within the outer case and form an annular chamber L' concentric to the receptacle for filtered water which may be either packed with a non-conducting substance as powdered charcoal, asbestos, or bibulous paper, as shown in Fig. 2, whereby the casing is caused to maintain a low degree of temperature with a minimum expense, or the space may remain unpacked to serve as a vacuum chamber.

In constructing the receptacle for filtered water of metal it is necessary to guard against corrosion or rust. Hence it is found necessary to coat the metal with cement, pottery, or paraffine or an analogous substance. Hence it is found that a receptacle formed of pottery, or terra cotta, as shown in Fig. 2, is very desirable in which the receptacle is formed of a size and contour to contain the inner or unfiltered water chamber and of less diameter than the outer case, whereby the annular chamber L' is formed, in which construction it is desirable to flare the upper end to a degree to cause the same to contact with the sides of the casing A, and seal the same against the ingress of water by cement or wax M.

In Fig. 3 the receptacle for filtered water is formed of metal properly coated, and preferably extends the entire height of the outer shell, and is suspended therein by a flange N which rests upon the outer shell, the flange of the inner receptacle resting thereon.

In the construction shown in Fig. 3, which is intended to illustrate a filter of greater size and capacity than that shown in Figs. 1 and 2, the figure being drawn on a reduced scale, there is provision made for withdrawing the water and sedimentary deposit from the receptacle B, by means of a pipe O, which may be made of metal or any plastic material as terra cotta, pulp, &c., and which is tapped into a valve P, seated in the bottom E of the receptacle, and leading outside the case A. Valve P comprises a flanged pipe P' threaded externally and internally at the lower end, the pipe O being screwed into the internally threaded portion and a nut P'' being screwed upon the externally threaded portion to compress gaskets Q arranged upon the top and bottom of bottom E of the receptacle, whereby the same is closed water tight.

R designates posts arranged upon each side of valve P, which support an inclined faced plate R' having a central perforation R'' beneath which projects a lever S, fulcrumed upon a bar extending transversely of the plate, and secured in the posts (as shown in the sectional view of Fig. 4), the lower end of lever S being pivotally secured to an upwardly opening valve T hinged to pipe P' at the opposite side from the attachment of lever S, said valve being intended to prevent drainage of sediment into pipe O, until the valve is raised by the vertical rod of a cleaning device which will now be explained.

In the operation of filter cylinder F, the sedimentary deposit will adhere to the interior and to the bottom E of the receptacle, thereby necessitating frequent removal of the sedimentary deposit.

To facilitate the cleaning of the cylinder and the bottom of the receptacle, there is employed a cleaner consisting of a vertical rod U, journaled in an adjustable cross-bar V having bifurcated ends V' adapted to embrace loops B''' and be held firmly thereby, and also having a central perforation V'' through which rod U is passed, the lower end of the rod being formed with a shoulder V''' adapted to rest upon the plate R', and with a projection V'''' adapted to bear upon the free end of lever S, thereby raising the valve T and allowing the water contained in the receptacle to flow into pipe O, together with the sediment being displaced by the revolution of rod M and the frictional engagement of horizontal and vertical brushes or scrapers secured thereon.

W designates bifurcated hangers adjustably secured to rod U by means of set screws U' whereby the same may be moved vertically upon the rod to conform to the interior of the receptacle for unfiltered water.

Between hangers W are secured arms W' formed with elongated slots W'' shown in dotted lines Fig. 5, through which bolts or screws W'''' also passed through hangers W pass, thereby allowing a horizontal adjustment of the same. Arms W' are bifurcated at the outer ends, to receive bars W''' between which are secured brushes, or scrapers X, which are clamped between the bars by means of bolts or screws X' passed through the bars and the bifurcated ends of the arms by which construction the brushes or scrapers are adjustable radially from the rod U to fit any desired size of filter, and are also reversible by merely unscrewing and removing bolts X' which allows of their removal and reversal.

To properly cleanse the bottom E of the water receptacle a brush or scraper Y is adjustably secured to the rod U, by a hanger Y', held in place by a set screw Y'' there being arms Y''' pivotally secured to the hanger Y' between which is clamped a brush or scraper Y'''' which bears frictionally upon the bottom E, the arms being movable at an angle to the rod U, to cause the same to bear upon the inclined bottom E whether formed with an upward or downward incline.

To facilitate the insertion of the rod U within the perforation R'' of plate R' the upper face is coved out conically as shown in Fig. 4, whereby the incline will guide the rod into the perforation, this arrangement being convenient by reason of the plate being usually covered with water, and hidden from view.

In the larger size of filters it is convenient to attach a hose Z to the pipe O, as shown in Fig. 3, whereby the sediment may be conducted to any desired place of deposit without necessitating the movement of the filter.

In operation water is poured into receptacle B, and percolates through the filtering cylinder F into the annular chamber H, and finds an exit through perforations D, passing through the charcoal or other material in the chamber I and is withdrawn through spigot J.

If the filter is intended for the use of ice for cooling the water, the insulating chamber L' is formed by adding the receptacle for water as supplementary to the outer shell, or casing as shown in Figs. 2 and 3.

When it is desired to clean the filtering cylinder; in the smaller forms the receptacle B is withdrawn from the filter which renders the operation of cleaning convenient, and in the large sizes, the rod M is inserted with the shoulder of the lower end resting upon plate R' and the projection resting upon and depressing the lever S, thereby allowing the water and sediment as it is displaced by the brushes or scrapers to flow through pipe O.

What is claimed is—

1. In a water filter, an inner water receptacle having perforations near its lower extremity and carrying within its walls an outwardly discharging porous filter, between which and the said water receptacle is an open space sealed above and below against the passage of water, except in a filtered state, in combination with an outer storage reservoir, substantially as shown and described.

2. In a water filter, an outer shell having a reservoir for filtered water contained therein an inner receptacle for unfiltered water removably connected therewith, an outwardly discharging filter located therein, a pipe connected with the inner receptacle and leading outside the outer shell, and a valve located within the inner receptacle and closing the pipe, when upon its seat, as and for the purpose set forth.

3. In a water filter, an outer shell, an inner receptacle for unfiltered water contained therein having an outwardly discharging porous filter located within the same, a pipe connected with the inner receptacle and leading outside the shell, a valve located within the inner receptacle and connected with the pipe, a fulcrumed lever connected with the valve, in combination with a revoluble cleaner provided with a rod adapted to open the valve, as and for the purpose set forth.

In testimony that we, CAROLINE B. ZIEGLER and JOHN F. ZIEGLER, claim the foregoing to be the joint invention of the said JOHN B. ZIEGLER, deceased, and JOHN F. ZIEGLER, we hereby affix our signatures in presence of two witnesses.

CAROLINE B. ZIEGLER,
JOHN F. ZIEGLER,
*Administrators of the estate of John B. Ziegler, deceased.*

JOHN F. ZIEGLER.

Witnesses:
WILLIAM WEBSTER,
CARROLL J. WEBSTER.